United States Patent [19]

Hollmann

[11] 4,322,937
[45] Apr. 6, 1982

[54] HARVESTER WITH INTERNAL METAL DETECTOR

[75] Inventor: Bernd Hollmann, Bielefeld, Fed. Rep. of Germany

[73] Assignee: Claas OHG, Harsewinkel, Fed. Rep. of Germany

[21] Appl. No.: 191,190

[22] Filed: Sep. 26, 1980

[30] Foreign Application Priority Data

Oct. 4, 1979 [DE] Fed. Rep. of Germany ....... 2940201

[51] Int. Cl.³ ............................................ A01D 69/10
[52] U.S. Cl. ............................... 56/10.2; 56/DIG. 15; 324/236
[58] Field of Search ......................... 56/10.2, DIG. 15; 324/236

[56] References Cited

U.S. PATENT DOCUMENTS

| | | | |
|---|---|---|---|
| 3,656,284 | 4/1972 | Meek et al. | 56/14.5 |
| 3,889,249 | 6/1975 | Bennett et al. | 56/10.2 |
| 3,959,953 | 6/1976 | Garrott | 56/10.2 |
| 3,972,156 | 8/1976 | Bennett et al. | 56/10.2 |
| 3,996,510 | 12/1976 | Guichard | 324/236 |

*Primary Examiner*—Robert A. Hafer

*Attorney, Agent, or Firm*—Pollock, Vande Sande & Priddy

[57] ABSTRACT

A harvester of the type comprising a pick-up mechanism operative to gather harvested material from the ground and to supply the same to a conveying structure within the harvester is further provided with a metal detector located within the harvester between the pick-up mechanism and conveying structure. The metal detector comprises a non-conductive shield structure which is disposed adjacent the path of movement of material passing from the pick-up mechanism to the conveying structure and arranged to provide a surface over which said material passes, and sensor means mounted within the shield structure and operative to produce a field which penetrates said surface and extends transversely across the path of movement of material being supplied by the pick-up mechanism to the conveying structure. The sensor means preferably operates to generate a high frequency oscillating field which is interrupted by the presence of metal objects in the material being fed to the conveying structure, with the field interruption producing a signal which shuts the harvester down.

6 Claims, 3 Drawing Figures

HARVESTER WITH INTERNAL METAL DETECTOR

BACKGROUND OF THE INVENTION

The present invention relates to harvesters having a metal detector thereon, and is more particularly concerned with such an arrangement wherein the metal detector is operative to produce a high frequency oscillating field which is interrupted by metal objects that approach the field, so that the field interruption produces a signal which can be used to either control or shut down the operation of the harvester.

Harvesters having metal detectors thereon have been suggested heretofore. In one known arrangement of this general kind, the metal detector comprises a detector coil which is mounted on a wooden beam that is positioned at a distance that is substantially one meter forward of the foremost metal part of the harvester. The detector coil reacts to the presence of metal pieces to produce an acoustic or visual alarm so that the harvester can be shut down before the detected metal object is actually transported into the harvester. Harvester arrangements of this type exhibit the disadvantage that their overall length is increased by the wooden beam and detector coil mounted thereon. In addition, these known systems have the disadvantage that a signal may be generated by metal objects that are actually embedded in the ground and which would not normally be a cause of concern, this disadvantage arising from the fact that it is normally impossible to so position the metal detector that it will be sensitive only to metal objects at ground level.

Other harvesters have been suggested heretofore (e.g., as described in DE-OS No. 22 52 595 and DE-OS No. 25 52 805) which are provided with metal detectors of the magnetic type, i.e., they employ arrangements for generating a direct current magnetic field, and an associated magnetic field detector coil. Magnetic metal pieces which interrupt the direct current magnetic field break the magnetic lines of force and thereby produce a voltage impulse in the detector coil which acts as a signal that is used to control an associated electrical switch. A fundamental disadvantage of this type of detector system is that it can detect only the presence of ferromagnetic objects, and it is incapable of protecting the harvester from damage resulting from the transport into the harvester, along with the harvested material, of other types of metal objects, e.g., those fabricated of copper, brass or aluminum.

In an effort to obviate some of the foregoing disadvantages, it has been suggested heretofore that agricultural harvesters be provided with an acoustic scanning system to detect foreign objects which might cause damage. This type of arrangement, however, can be used effectively only when the harvester operates on flat ground surfaces because, when the system is operated on uneven land, roots, dirt and other foreign bodies are detected and cause undesired activation of the apparatus. In addition, this particular system is incapable of protecting the harvester against the ingress of foreign bodies which are firmly entangled in the harvest material since an acoustic signal indicating the presence of the foreign body will be given only when the foreign body is located adjacent the outer surface of the material flowing toward and into the harvester.

The present invention is directed to an improved metal detector arrangement which combines the advantages of approaches suggested heretofore without exhibiting their disadvantages and, more particularly, is concerned with the provision of a harvester/metal detector arrangement which is compact, which is insensitive to metal elements that are embedded in the ground, and which protects the harvester against damage resulting from the presence of both magnetic and non-magnetic metal objects that are supplied to the harvester along with the harvest material.

SUMMARY OF THE INVENTION

In accordance with the present invention, a harvester of the type comprising a pick-up mechanism and an associated conveying structure located within the harvester, is provided with a metal detector that is positioned internally of the harvester between the pick-up mechanism and conveying structure. The metal detector preferably comprises a plurality of sensors that extend across the width of the conveying track within the harvester, the sensors being of a type which are in themselves well known and which are usually employed as control devices, e.g., in machine tools. More particularly, the sensors consist basically of an oscillator and an associated coil operative to produce a high frequency alternating field which is responsive to the approach or presence of a metal object to generate eddy-current losses. These losses are detected by a resonant circuit which produces a control signal that can be used to cause shut down of the harvester.

Sensors of the aforementioned type are disposed within a shield element that is fabricated of a non-conductive material, preferably a synthetic plastics material. The shield element is positioned to provide a surface along which material flows as it passes from the pick-up mechanism to the conveying structure within the harvester, and the shield element is preferably rotated in the direction of the transported material so that it acts as a conveying agent for the transport of the harvested material. In the preferred embodiment of the invention, the shield element comprises a hollow cylindrical roller, with the sensors being nonrotationally mounted within the outer rotating covering surfaces of the shield structure.

The system of the present invention is also preferably provided with pressure applying devices, such as one or more resiliently supported feed rollers, which urge the harvested material toward the shield element as said material, and any metal objects therein, flow from the pick-up mechanism to the conveying structure of the harvester.

The particular location of the metal detector, i.e., downstream of the pick-up mechanism in the harvester but upstream of the subsequently operative conveying structure in the harvester, is especially advantageous because, at this location, the harvest flow is relatively thin and therefore can be easily penetrated by a probe field. Should the depth of penetration of a single probe field be insufficient, however, sensors of the type described can be disposed behind shields that are located on both sides of the flowing material, to generate probe fields which extend toward the flowing material from opposite sides of the flowing material in the region between the pick-up mechanism and conveying structure of the harvester.

BRIEF DESCRIPTION OF THE DRAWINGS

The foregoing objects, advantages, construction and operation of the present invention will become more readily apparent from the following description and accompanying drawings wherein.

DESCRIPTION OF THE PREFERRED EMBODIMENTS

Figure 1:
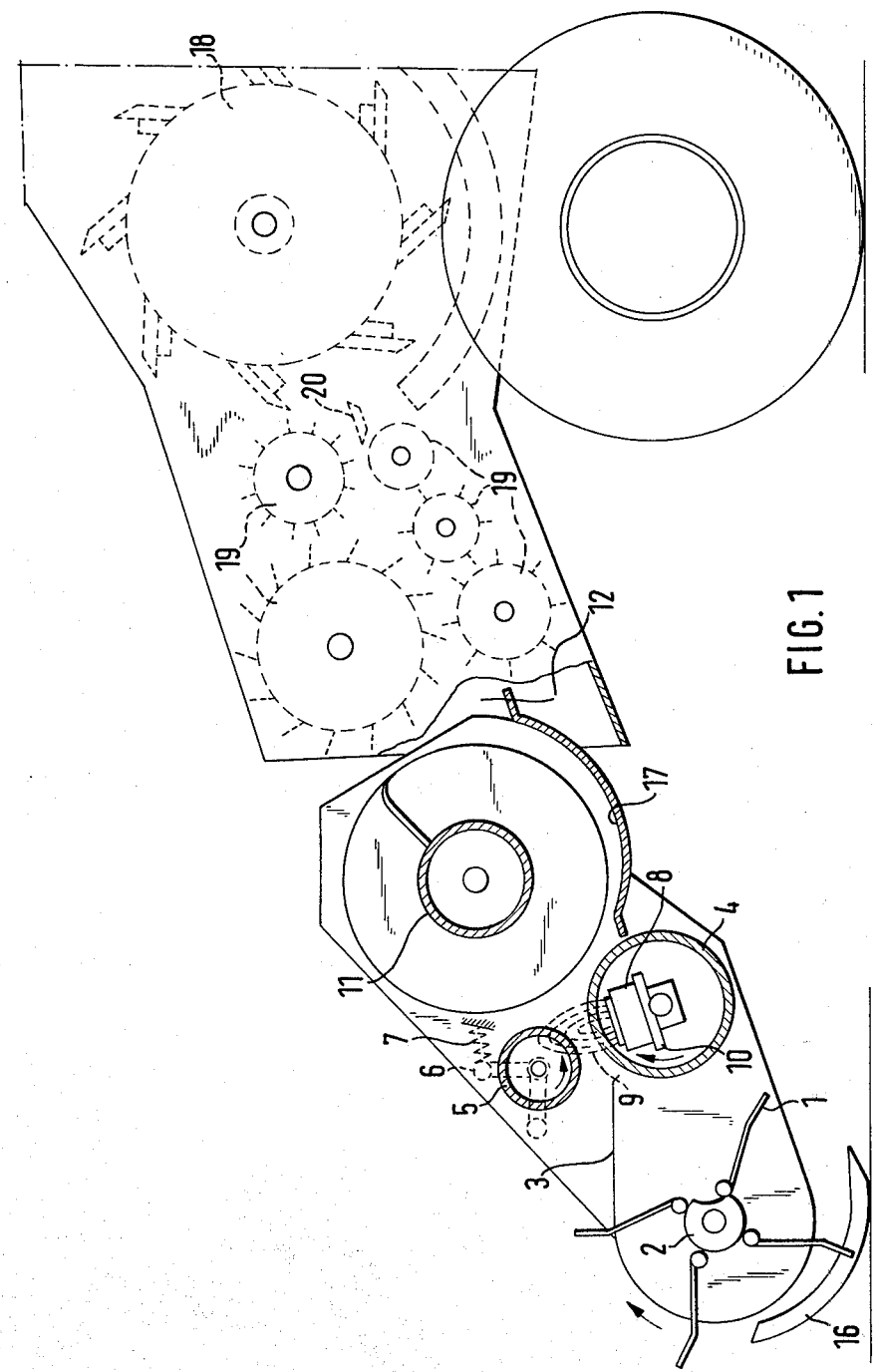
FIG. 1 is a schematic view, partially in longitudinal cross section, of a harvester constructed in accordance with a first embodiment of the present invention.
Figure 2:
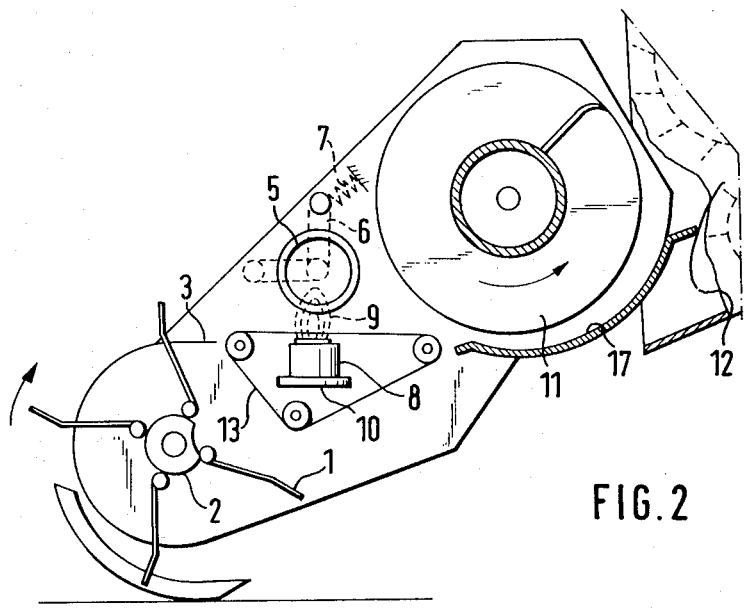
FIG. 2 is a view similar to FIG. 1 illustrating a second embodiment of the present invention.
Figure 3:
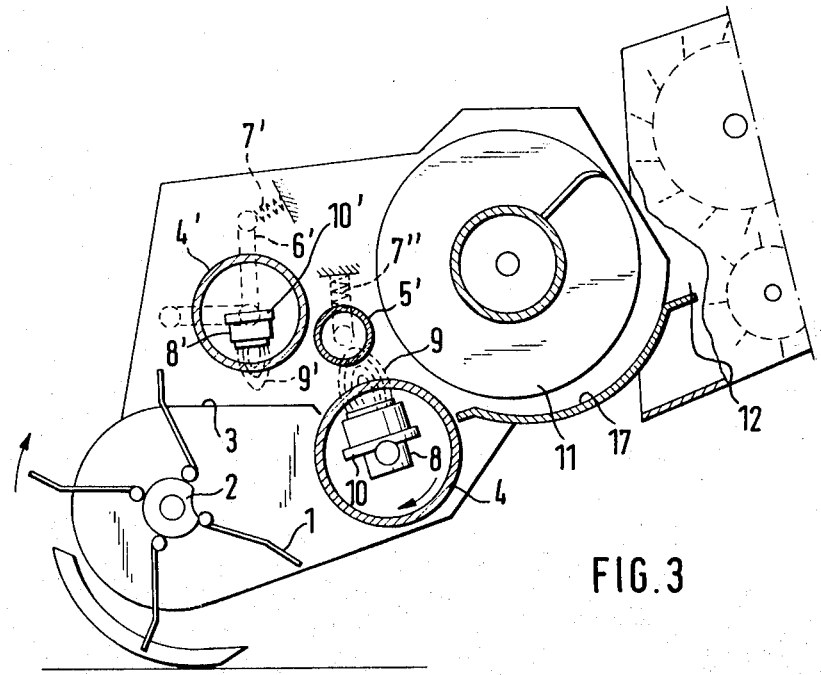
FIG. 3 is an analogous representation showing a third embodiment of the present invention wherein metal detectors are positioned on opposite sides of the harvest material flow.

The harvester shown in each of FIGS. 1-3, of which only a section is represented, is the same in each figure and is, in itself, of known configuration. The harvester typically employs a cam-controlled pick-up mechanism at one end of the harvester, consisting of a plurality of rotating spring-mounted prongs 1 which are selectively actuated by a cam 2, and which operate to feed harvested material from the ground into the harvester along a lead-in surface 3. The distance of the pick-up mechanism relative to the ground is determined and maintained by a skid 16 situated at the front end of the harvester. The harvested material passes from surface 3 to a conveying structure which may take various forms and which, in the embodiments represented in the drawings, consists of a transverse spiral conveyor 11 that rotates adjacent to but spaced from a curved surface 17 and cooperates therewith to compress or compact the harvested material, with the material then being fed via the outlet 12 of said conveyor 11 through a plurality of feed cylinders 19 over a cutter bar 20 and into a rotating cutter drum 18 which chops up the compressed or compacted material. The chopped up harvested material is then conveyed to the rear of the harvester.

In accordance with the present invention, a metal detector is positioned within the harvester in the region downstream of the pick-up mechanism 1, 2 and upstream of the subsequently operative conveying structure, so that any metal objects which are supplied to the harvester by the pickup mechanism, along with the harvested material, can be detected and the operation of the harvester interrupted, before such metal objects pass into the conveying structure where they might damage the harvester. This particular positioning of the metal detector, which is one of the important features of the present invention, is employed in each of the embodiments of FIGS. 1-3, with these embodiments differing from one another with respect to the particular arrangement of the metal detector employed.

In the embodiment shown in FIG. 1, the metal detector comprises a hollow cylindrical roller 4, constructed of non-conductive material such as a plastics material, which extends across the entire width of the harvested material flow. Roller 4 is adapted to be rotated by an appropriate drive (not shown) so that its upper surface, located between surfaces 3 and 17 in the harvester, moves in the direction of material flow and acts, in effect, as part of the conveying arrangement. A transverse support rod 10 is located within cylinder 4, and supports thereon a plurality of sensors 8 of the general type previously described, with these sensors 8 being operative to produce a high frequency probe field 9 which extends transverse to the direction of flowing materials and which penetrates from the interior of shield structure 4 to the exterior thereof and through the entire thickness of the flowing harvested material. A pressure applying device, comprising for example a feed roll 5 which may be mounted for rotation, is positioned in spaced relation to roller 4 on the opposite side of the flowing harvested material, and roller 5 is preferably resiliently supported in place by means of a toggle lever mechanism 6 which cooperates with a tension spring 7 to cause the feed roller to exert a force on the harvested material to urge the material toward the metal detector and into firm contact with the outer surface of roller 4.

The embodiment of FIG. 2 is entirely similar to that of FIG. 1, and like numerals have been used to identify like parts therein. In contrast to the embodiment of FIG. 1, however, the arrangement shown in FIG. 2 employs as the shield structure a revolving band 13 of nonconductive material, mounted on support rollers as indicated, and presenting an upper flat surface which is substantially coplanar with surface 3.

The embodiment of FIG. 3 employs an arrangement similar to that already described in reference to FIG. 1, i.e., a rotating cylinder 4 mounted below the path of harvest flow in the region between the pick-up mechanism and conveying structure of the harvester, for supporting sensor structures 8, 10 therein; and a pressure applying roller 5' is located on the opposite side of the flowing material and urged toward roller 4 by means of a compression spring 7''. In addition, the arrangement of FIG. 3 provides a further shield cylinder 4' which is positioned above the material flow and above lead-in surface 3. This added cylinder 4' is rotatably attached to a toggle lever mechanism 6 which is associated with a tension spring 7' that pulls the cylinder 4' over the toggle lever mechanism in the direction of the adjacent sheet or surface 3. Cylinder 4' has mounted therein further sensor structures 8', 10' which generate a probe field 9' that extends toward the flowing material on the side thereof opposite to probe field 9 produced by sensors 8, 10. In this particular arrangement, therefore, the possible presence of metal objects is sensed in the region adjacent surface 3, as well as downstream of said surface 3; and, in addition, the flowing material is penetrated by two probe fields 9, 9' which are directed toward said material from the opposite sides thereof respectively.

Having thus described my invention, I claim:

1. In a harvester of the type comprising a pick-up mechanism at one end of the harvester operative to gather harvested material from the ground, said harvester having a transverse spiral conveyor therein arranged adjacent said one end of said harvester immediately downstream of said pick-up mechanism to receive harvested material from said pick-up mechanism and to feed the same toward the other end of said harvester, the improvement wherein said harvester includes a metal detector located adjacent said one end of said harvester between said pick-up mechanism and said transverse spiral conveyor, said metal detector comprising a shield structure disposed adjacent the path of movement of material passing from said pick-up mechanism to said transverse spiral conveyor and providing a nonconductive surface over which said material passes, means for effecting movement of the said nonconductive surface of said shield structure to assist in the transport of said material from said pick-up mechanism toward said transverse spiral conveyor, and sensor means mounted at a fixed position on said harvester adjacent said shield structure, said sensor means being operative to produce a metal detecting field which penetrates said nonconductive surface and extends through the path of movement of material that is passing from said pick-up mechanism along said moving nonconductive shield surface to said transverse spiral conveyor.

2. The harvester of claim 1 wherein said sensor means comprises a plurality of sensors laterally spaced from one another across the entire width of the path of movement of said material from said pick-up mechanism toward said transverse spiral conveyor.

3. The harvester of claim 1 wherein said shield structure comprises an elongated hollow cylindrical roller fabricated of a nonconductive material and mounted for rotation about an axis transverse to the path of movement of said material, said nonconductive surface being the outer surface of said roller, said sensor means being mounted within said hollow cylindrical roller.

4. The harvester of claim 1 including pressure means disposed in spaced relationship to said shield structure on the side of the path of movement of said material opposite to said moving nonconductive surface and operative to press said material toward said moving surface as said material passes over said surface from said pick-up mechanism to said transverse spiral conveyor.

5. The harvester of claim 4 wherein said prsessure means comprises a resiliently supported feed roller.

6. The harvester of claim 1 wherein said sensor means is mounted below the path of movement of said material from said pick-up mechanism toward said transverse spiral conveyor, the metal detecting field produced by said sensor means being directed in an upward direction toward the moving material, and further sensor means mounted between said pick-up mechanism and said transverse spiral conveyor at a position above the said path of movement of said material, said further sensor means being operative to produce a metal detecting field which is directed in a downward direction toward the moving material passing from said pick-up mechanism toward said transverse spiral conveyor.

* * * * *